Oct. 12, 1948.     V. ALDREANY     2,451,017
MOVIE CAMERA ATTACHMENT FOR MAKING LAP DISSOLVES
Filed Feb. 14, 1945
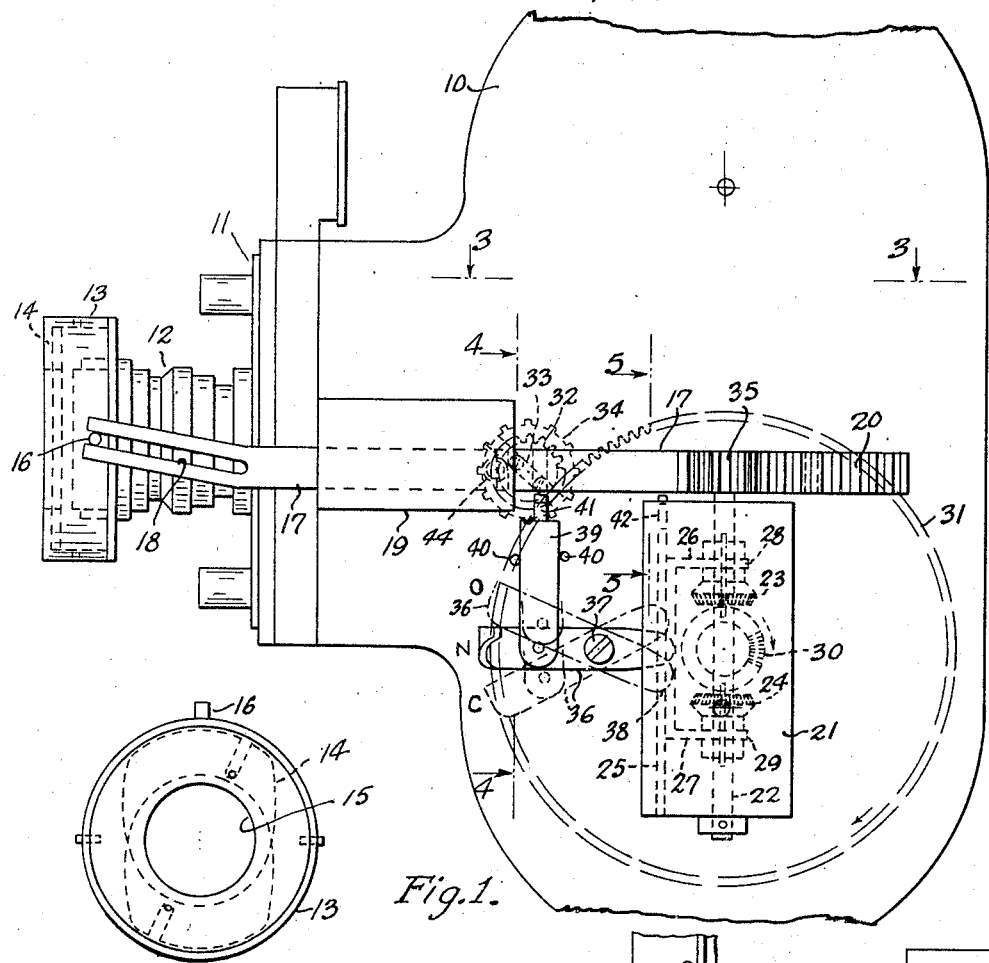
INVENTOR
Victor Aldreany
BY
Wooster Davis
ATTORNEYS Patented Oct. 12, 1948

2,451,017

UNITED STATES PATENT OFFICE 2,451,017

MOVIE CAMERA ATTACHMENT FOR MAKING LAP DISSOLVES

Victor Aldreany, Danbury, Conn.

Application February 14, 1945, Serial No. 577,887

9 Claims. (Cl. 88—16)

This invention relates to motion picture cameras, and has for an object to provide an improved and simple attachment for such cameras for making either fade-ins, fade-outs, or lap dissolves.

Another object is to provide such a device which may be applied to or mounted on the usual removable side plate of the camera housing. It will, therefore, not require change in the present camera mechanism.

With the foregoing and other objects in view, I have devised the construction illustrated in the accompanying drawing forming a part of this specification. It is, however, to be understood the device is not limited to specific details of construction and arrangement shown, but may embody various changes and modifications within the scope of the invention.

In this drawing:

Fig. 1 is a side elevation of the housing of a motion picture camera showing my device applied thereto;

Fig. 2 is an elevation of the auxiliary lens housing;

Figs. 3, 4 and 5 are detail sections substantially on lines 3—3, 4—4 and 5—5 respectively of Fig. 1, and Fig. 6 is a detail side elevation showing a slight modification.

As previously indicated, this device is an attachment for regular motion picture cameras, whereby the operator may at will make fade-ins, fade-outs or lap dissolves if he wishes, a lap dissolve being, as is well known, a gradual fading-out of one scene and gradual fading into another without a dark space between them. It is made of a fade-out of the first scene, then winding back a suitable length of film, and then superimposing a fade-in of the second scene on the fade-out of the first. Thus, when the superimposed part is projected on the screen, there will be a gradual transition from the first scene to the second.

The mechanism shown for accomplishing these results is mounted on the removable side plate 10 of the camera housing, this plate being removable for insertion and removal of the film into and from the mechanism within the camera before and after exposure. There is also shown diagrammatically a turret 11 for carrying different lenses and moving them to the operative positions, and placed over the front of the lens assembly 12 in the operating position is a casing 13 in which is mounted an auxiliary diaphragm 14 for closing the orifice 15. The usual diaphragm in the lens set-up controlling the light aperture is not disturbed. This auxiliary diaphragm 14 may be opened and closed by moving the pin 16 around the periphery of the casing.

Mounted on the plate 10 is a slidable rack bar 17 having an inclined slot 18 to receive the pin 16. This bar is mounted to slide in a suitable guide 19 and at its opposite end portion has a rack 20. Mounted on the plate 10 at one side of this rack is a casing 21 in which is mounted a short shaft 22, and splined on this shaft so as to rotate with it but slidable longitudinally thereon, are two small bevel gears 23 and 24. In the front of the casing 21 is a slidable plate 25, and on its inner wall this plate carries two arms 26 and 27 having forked ends 28 and 29 respectively running in grooves in the hubs of the gears 23 and 24 respectively, so that by sliding the member 25, either the gear 23 or the gear 24 may be brought into mesh with an intermediate bevel gear 30 connected by a short shaft with a large gear 31 mounted on the inner side of the plate 10 and meshing with a small pinion 32 operated by the driving spring (not shown) of the camera. This pinion 32 is provided with a slot 33 whereby this pinion is in driving connection with the film operating mechanism in the camera. In this case it fits over one of the sprockets 34 used for controlling or feeding the film, the slot 33 forming a driving connection with two screws usually found on the sprocket. As gear 31 is carried by the plate 10, it will automatically be placed in mesh with the pinion 32, as the side plate 10 is placed in position on the housing.

Secured on the upper end of the shaft 22 is a pinion 35 adapted to mesh with the rack 20 under certain conditions, as will presently be described, to operate the auxiliary shutter 14. Forwardly of the casing 21 is a small hand lever 36 pivoted at 37 and whose inner end 38 is connected with the sliding plate 25. A bar 39 is pivotally connected to the lever 36 and guided by suitable guide means such, for example, as the pins 40, and this bar is provided with a reduced end portion 41 which may be slid under the bar 17 to shift the rack 20 outwardly to mesh with the pinion 35, as indicated in Fig. 4. The lever 36 may assume any one of the three positions shown, the intermediate or full line position indicated by the letter N being the neutral position; the upper broken line or O position being the opening position (meaning it will cause gradual opening of the diaphragm 14 for a fade-in); while the dotted line or C position is the closing position (meaning, when it is in this position it will cause a gradual closing of the diaphragm 14 for a fade-out). On the upper end of the sliding plate 25 is a reduced portion 42 similar to 41 of the member 39, and each has an inclined end 43 to slide under the bar 17 and by camming action to force the bar outwardly to bring its rack 20 into mesh with the pinion 35. A coiled spring 44 carried by the bar 17 between it and the outer wall of the guide 19 tends to force this bar inwardly against the plate 10, as shown in Fig. 3, to shift and hold the rack 20 out of mesh with the pinion 35. It also provides sufficient friction to normally hold the bar 17 stationary when out of mesh with the pinion. In the rear wall of the bar 17 are transverse grooves or notches 45 and 46 to cooperate with the reduced extension 41 under certain conditions to permit the rack 20 to shift from mesh with pinion 35 and lock the bar against movement, and a similar groove or notch 47 to cooperate with the reduced extension 42 of the plate 25 to permit disconnection of the rack 20 from the pinion 35 and lock the rack and bar 17 against movement at a certain time.

The operation is as follows:

When the lever 36 is in the full line or N position, it is in the neutral or inoperative position and the gears 32 and 31 will operate in the operation of the camera without affecting the auxiliary diaphragm 14, as neither gear 23 nor 24 is in mesh with the gear 30. In this position the spring 44 carried by the bar 17 shifts it backwardly against the plate 10 so that the rack 20 is out of mesh with the pinion 35, as indicated in Fig. 3. In this position the bar 17 may be slid by hand to bring the diaphragm 14 to the open or closed position, as desired, the position shown being the open position for the diaphragm. If now the operator wishes to make a fade-out, he swings the lever 36 downwardly to the C position. This slides the member 25 upwardly and forces the reduced end 42 of this member under the bar 17. In this action the inclined or cam portion 43 pushes the bar 17 outwardly, so that the rack 20 comes into mesh with the pinion 35. At the same time the slide 25 carries with it the gear 24 into mesh with the gear 30 which rotates with the gear 31. If the operator now presses on the starting button of the camera, as the gears 32 and 31 will rotate with this operation of continuing to take the picture, the gear 30 rotates and through the gear 24 and pinion 35 will slide the rack 20 and bar 17 forwardly or to the left, causing the inclined slot 18 to gradually move the pin 16 downwardly and thus gradually close the auxiliary shutter 14, causing the fade-out. At the end of this movement the shutter 14 is closed and the notch 47 comes over the end 42 of the slide 25 and permits the rack 20 to move away from pinion 35 under action of the spring 44 and thus stop further movement of the bar 17 and further closing of the shutter 14, preventing any injury to the camera. If now the operator wishes to complete the lap-dissolve by superimposing a fade-in on the fade-out portion of the film, he winds back the proper length of film and then swings the lever 36 upwardly to the upper or O position. This withdraws the end 42 of the slide 25 from the notch 47 in the bar 17, unlocking it, but at the same time it shifts the member 39 upwardly and forces its reduced end 41 under the bar 17, as shown in Fig. 4, this movement causing the inclined or cam portion 43 of the portion 41 to force the rack 20 outwardly into mesh with the pinion 35. At the same time, the lever 36 shifts the slide 25 downwardly, and shifts the gear 24 out of mesh with the gear 30 and carries the gear 23 into mesh with gear 30. If the operator now again starts the camera, rotation of the gear 30 will drive the gear 23, which will rotate the pinion 35 in the opposite direction, and as it is now in mesh with the rack 20, will shift the bar 17 backwardly or to the right, causing the inclined slot 18 to move the pin 16 upwardly, and thus gradually open the auxiliary shutter 14 to give the fade-in. At the end of this movement the recess 46 in the back of the bar 17 will come over the reduced end 41 of the member 39 and permit the rack 20 to be shifted away from the pinion 35 by the spring 44, thus preventing any further movement of the bar 17 and breaking any of the parts. For normal operation of the camera without affecting this auxiliary shutter 14, the lever 36 may be left in this position, or it could be moved to the intermediate or neutral position. If it is desired to lock the operating mechanism released from the auxiliary shutter 14, the bar 17 may be shifted to the right by hand bringing the second notch 45 into alignment with the reduced end 41 of member 39, and then by shifting the lever 36 upwardly, this end will be shifted into the notch 45, locking the bar 17 in this position. This movement of the bar 17 will carry the open end of the slot 18 away from the shutter operating pin 16, thus disconnecting the entire mechanism from this shutter, and making this auxiliary mechanism inoperative while operating the turret to change lenses or while using a lens without the auxiliary shutter.

Instead of using the pin and slot connection 16—18 shown in Fig. 1, this may be reversed, as shown in Fig. 6, in which the bar 17, instead of being slotted, has its end portion slidable between a pair of pins 16a for operating the shutter 14. The effect is just the same as a pin and slot connection. This means of operating the shutter from the control mechanism is shown merely by way of example, as any other suitable operating connection may be used.

Having thus set forth the nature of my invention, what I claim is:

1. In a motion picture camera including a housing enclosing mechanism for operating a film, and an adjustable shutter for controlling passage of light through the lens to the film, an easily removable side plate for the housing permitting access to the housing for insertion and removal of film in and from the film operating mechanism, mechanism mounted on the plate and removed and applied with it for gradually operating the shutter to gradually vary the light entering therethrough, means connecting said latter mechanism with the film operating mechanism for operation thereby and placed in operative relation by the act of placing the plate in position on the open side of the housing, manually controlled means on the plate for placing the second mechanism in driving relation with the shutter to operate the shutter during movement of the film, and means on the plate operated in timed relation with the shutter operating means for automatically rendering the shutter operating means inoperative after a given operation of the shutter.

2. In a motion picture camera including a housing enclosing mechanism for operating a film, and an adjustable shutter for controlling passage of light through the lens to the film, a readily removable side plate for the housing permitting access to the housing for insertion and removal of film in and from the operating mechanism, mechanism mounted on the plate so as to be removed and applied with it, for gradually operating the shutter to gradually vary the light entering therethrough comprising a slidable bar including a rack mounted on the plate, means connecting the bar with the shutter for operating it, a pinion on the plate adapted to mesh with the rack to slide the bar, a gear mechanism mounted on the plate connected with the film operating mechanism for operating the pinion, manually operable means on the plate for rendering said gear mechanism operative to shift the bar, and means on the plate operated in timed relation with movement of the bar for automatically rendering said gear mechanism ineffective to shift the bar after a given movement thereof.

3. In a motion picture camera including a lens, mechanism for operating the film, a housing enclosing said mechanism open on one side and an adjustable shutter for controlling passage of light through the lens to the film, a removable plate for closing said open side, means mounted on the plate for operating the shutter to gradually vary the light entering therethrough comprising a slidable rack, means connecting said rack with the shutter to operate it, a pinion adapted to mesh with the rack, means for driving the pinion from the film operating mechanism, manual means for making said driving means effective to shift the rack while the film is being operated, and automatic means operated in timed relation with the rack for disconnecting said driving means after a given movement of the rack.

4. In a motion picture camera including a lens, a housing, mechanism in the housing for operating the film and an adjustable shutter for controlling passage of light through the lens, a plate closing one side of the housing and easily removable to permit access to said mechanism for insertion and removal of a film, means mounted on the plate and removable therewith for operating the shutter to gradually vary the light entering therethrough comprising a slidable rack, means connecting said rack with the shutter to operate it, a pinion adapted to mesh with the rack, means for driving the pinion from the film operating mechanism comprising a bevel gear driven by said mechanism, a shaft on which the pinion is mounted, bevel gears splined on the shaft on opposite sides of the first gear, a lever for alternately shifting the gears on the shaft into mesh with the first gear to drive the pinion in opposite directions, means operated by said lever for placing the pinion and rack in mesh to drive the rack, and means for automatically disconnecting the rack and pinion after given movement of the rack.

5. In a motion picture camera including a lens, a housing, mechanism within the housing for operating the film and an adjustable shutter for controlling passage of light through the lens, a plate closing one side of the housing and readily removable to permit access to said mechanism for insertion and removal of a film, means mounted on the plate for operating the shutter to gradually vary the light entering therethrough comprising a slidable rack, means connecting said rack with the shutter to operate it, a pinion adapted to mesh with the rack, means for driving the pinion from the film operating mechanism comprising a bevel gear driven by said mechanism, a shaft for driving the pinion, a pair of bevel gears splined on the shaft one on each of the opposite sides of the first gear, a manually operable lever adapted to shift either gear on the shaft into mesh with the first gear to drive the pinion in either direction, cam means operated by the lever to at the same time shift the rack into mesh with the pinion, and means to automatically disconnect the rack from the pinion after the rack has been shifted a given amount.

6. In a motion picture camera including a housing enclosing film operating mechanism, and a removable side plate for the housing, an adjustable shutter for controlling the light through the lens, a gear mounted on the inner side of the plate, means connecting said gear with the film operating mechanism to operate the gear therefrom, a second gear on the plate connected with the first gear, a shaft, a pair of gears splined on the shaft one on each of the opposite sides of said second gear, manual means for shifting either of the splined gears into mesh with the second gear, a slidable rack, a pinion on the shaft adapted to mesh with the rack, means connecting the rack with the shutter for operating it, and means controlled by the manual means to control meshing of the rack with the pinion.

7. In a motion picture camera including a housing enclosing film operating mechanism, and a removable side plate for the housing, an adjustable shutter for controlling the light through the lens, a gear mounted on the inner side of the plate, means connecting said gear with the film operating mechanism to operate the gear therefrom, a second gear on the plate connected with the first gear, a slideable rack mounted on the plate, means connecting said rack with the shutter for operating it, a shaft on the plate, a pinion on the shaft adapted to mesh with the rack, a pair of gears splined on the shaft on opposite sides of the second gear, manual means for shifting either of said splined gears into mesh with the second gear to operate the shaft and shift the rack in opposite directions, and means controlled by said manual means for shifting the rack to and from mesh with the pinion.

8. In a motion picture camera including a housing enclosing a film operating mechanism, and a removable side plate for the housing, an adjustable shutter for controlling the light through the lens, a gear mounted on the inner side of the plate, means connecting said gear with the film operating mechanism to operate the gear therefrom, a bevel gear mounted on the plate connected with the first gear, a slidable rack mounted on the plate, means connecting the rack with the shutter for operating it, a shaft, a pinion on the shaft adapted to mesh with the rack for operating it, a pair of bevel gears splined to the shaft and located one on each of the opposite sides of the bevel gear, manual means for shifting the splined gears alternately into mesh with the bevel gear to operate the shaft and rack in opposite directions, means controlled by said manual means for shifting the rack into mesh with the opinion, and means permitting the rack to automatically move out of mesh with the pinion after a given movement of the rack.

9. In a motion picture camera including a housing enclosing film operating mechanism, a removable side plate for the housing permitting access to said mechanism for insertion and removal of a film, an adjustable shutter for controlling the passage of light through the lens to the film, a slidable rack mounted on the plate, means connecting the rack with the shutter to operate it, means mounted on the plate connected with the film operating mechanism for shifting the rack, manual means on the plate for so controlling the rack shifting means as to shift the rack in opposite directions as desired, and means on the plate operated in timed relation with movement of the rack for automatically disconnecting the rack shifting means after a given movement of the rack.

VICTOR ALDREANY.

REFERENCES CITED

The following references are of record in the file of this patent:

UNITED STATES PATENTS

| Number | Name | Date |
|---|---|---|
| 1,029,997 | Ivatts | June 18, 1912 |
| 1,271,929 | Nelson | July 9, 1918 |
| 1,447,906 | Snyder et al. | Mar. 6, 1923 |
| 1,450,433 | Davis | Apr. 3, 1923 |
| 1,787,271 | Hayden | Dec. 30, 1930 |
| 1,934,484 | Camilli | Nov. 7, 1933 |
| 2,065,777 | Weissbrodt | Dec. 29, 1936 |
| 2,117,694 | Becker | May 17, 1938 |
| 2,188,764 | Walsh | Jan. 30, 1940 |
| 2,305,664 | Bogopolsky | Dec. 22, 1942 |
| 2,347,520 | Sperry et al. | Apr. 25, 1944 |
| 2,376,300 | Widmer | May 15, 1945 |

FOREIGN PATENTS

| Number | Country | Date |
|---|---|---|
| 340,049 | Germany | Aug. 30, 1921 |